J. W. WARREN.
BOLTING-UP DEVICE.
APPLICATION FILED SEPT. 9, 1919.
1,348,339.
Patented Aug. 3, 1920.
2 SHEETS—SHEET 1.
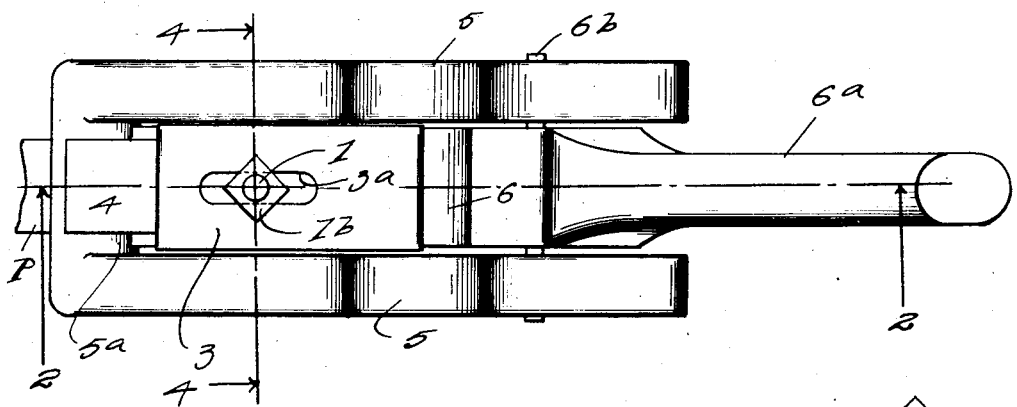
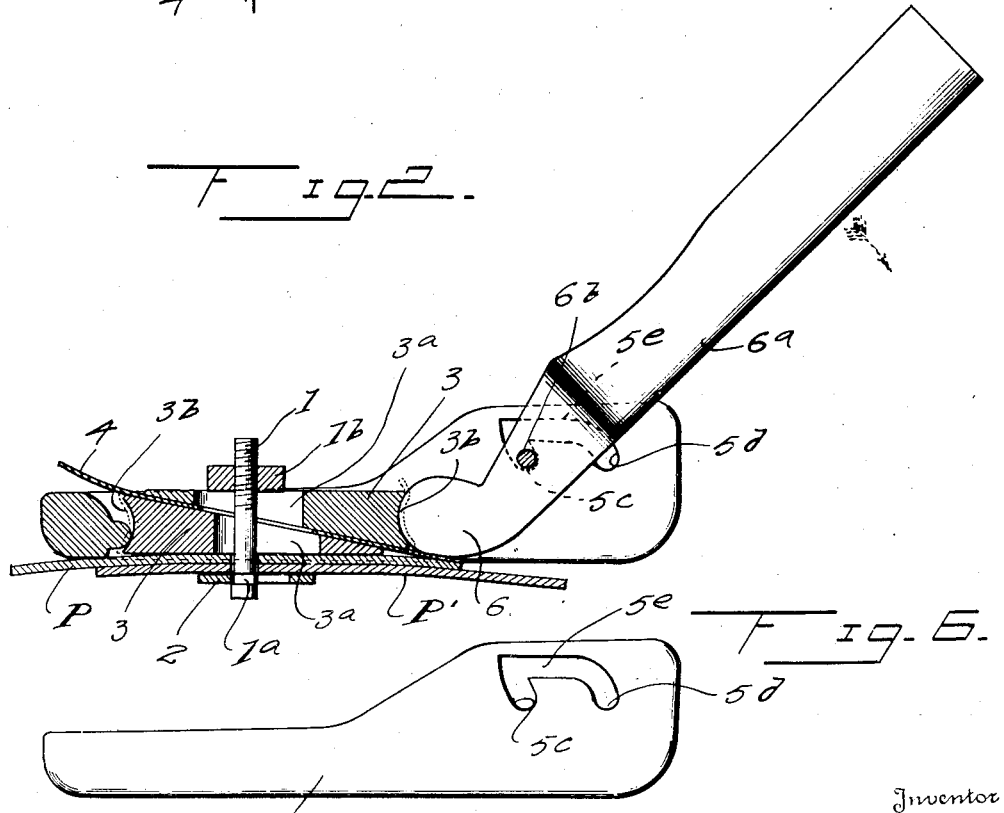

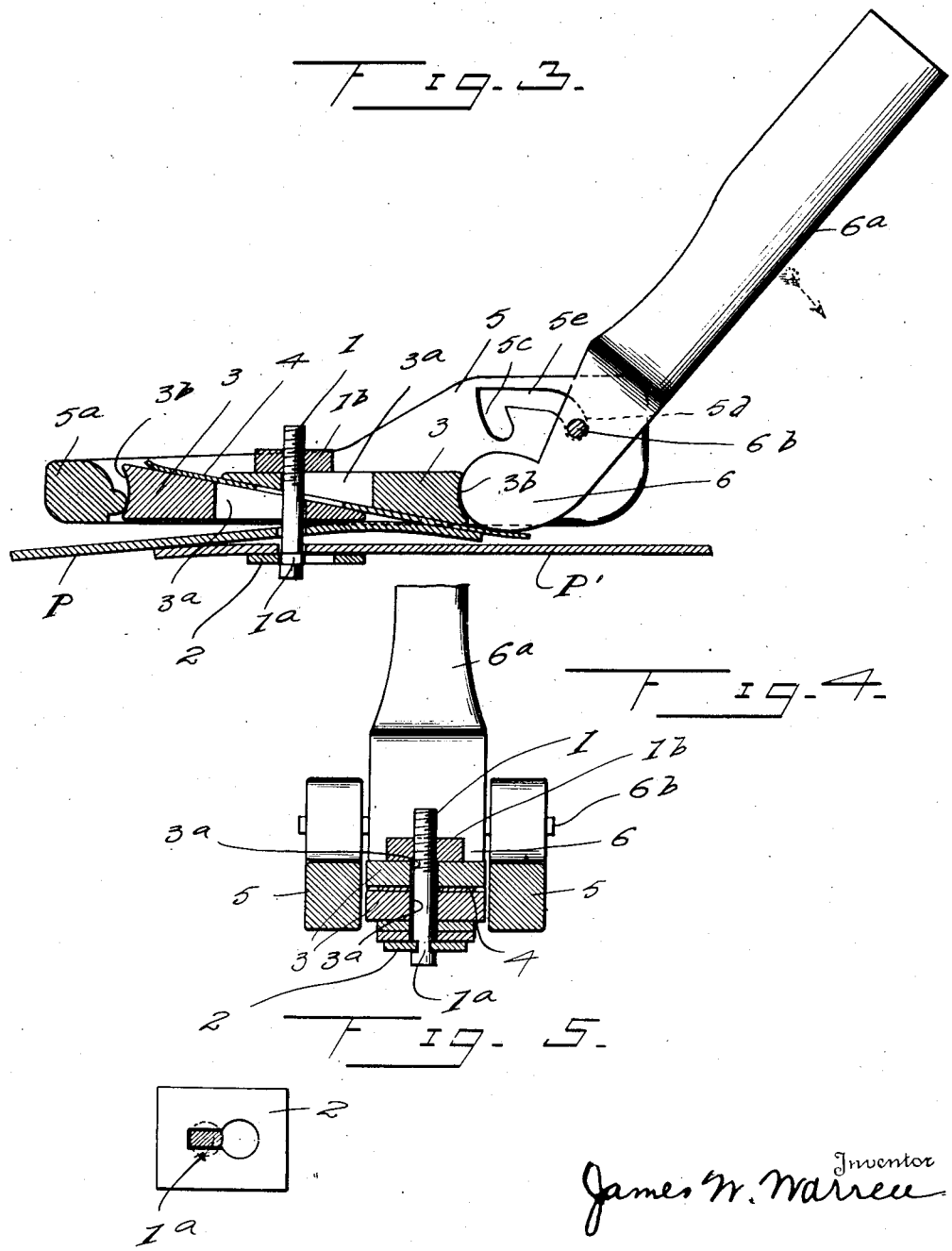

UNITED STATES PATENT OFFICE.

JAMES W. WARREN, OF ALEXANDRIA, VIRGINIA.

BOLTING-UP DEVICE.

1,348,339.  Specification of Letters Patent.  Patented Aug. 3, 1920.

Application filed September 9, 1919. Serial No. 322,739.

*To all whom it may concern:*

Be it known that I, JAMES W. WARREN, a citizen of the United States, residing at Alexandria, in the county of Alexandria and State of Virginia, have invented certain new and useful Improvements in Bolting - Up Devices, of which the following is a specification.

This invention relates to means for drawing together or bolting up metal plates in structural iron and steel work, such as the metal plates of iron ship hulls and the like; and it consists in a novel means for quickly and temporarily bolting up such plates preparatory to uniting them by rivets or welding them.

The metal plates used in making hulls of vessels ordinarily do not fit exactly and to enable the plates to be properly united it is essential that their overlapped edges should be brought tightly together before the rivets are applied. It has been customary to temporarily bolt these plates together by inserting ordinary bolts through some of the registering rivet holes and then applying nuts to the bolts in the usual manner. Such operation is tedious and time consuming and requires many turns of the nuts on the bolts to bind the plates tightly together.

The object of my invention is to enable the securing bolts to be very quickly applied and tightened; and as readily released. For this purpose I employ novel bolting up devices hereinafter fully described, each comprising in brief, a bolt transfixing the plates; two opposite wedges slotted for the passage of the bolt and adapted to be inserted between the plates and the nut on the bolt; and novel means for quickly and easily forcing the wedges together so as to cause the bolt to forcibly bind the plates together, as the wedges bind between the outermost plate and the nut on the bolt. I also provide novel means whereby the wedges when tightened can be temporarily locked together to prevent them loosening up under the jarring of the riveting machines.

I will explain the invention with reference to the accompanying drawings to enable others skilled in the art to readily adopt and use the invention and then summarize in the claims appended hereto the essentials of the invention and novel features of constructions and combinations of parts for which protection is desired.

In said drawings:

Figure 1 is a top plan view of the at present preferred form of bolting up devices with the parts ready to tighten the bolt.

Fig. 2 is a vertical longitudinal section on the line 2—2 of Fig. 1.

Fig. 3 is a similar section showing the parts ready to tighten the wedges.

Fig. 4 is a transverse section on line 4—4, Fig. 1.

Fig. 5 is a detail view showing the slotted bolt head washer.

Fig. 6 is a side elevation of a frame member.

In the drawings P and P' represent portions of two metal plates, such as are used in the hull of an iron vessel, or other structural iron work, which are to be riveted or welded together; and which are usually perforated on their overlapping edges for the passage of the rivets by which they are to be permanently secured together. These plates are temporarily united by bolts 1—, as hereinafter explained, inserted through registering rivet openings in the plates.

The bolts for temporarily bolting together the plates P P' may be of any suitable construction and are provided with nuts $1^b$; I prefer to use bolts as shown in Figs. 1-4, having side slots $1^a$ at the end where the head usually is formed—which slots are engaged by a washer plate 2, having a key slot large enough at one end to be readily slipped over the end of the bolt 1—, and a contracted portion adapted to engage with the slots $1^a$ in the end of the bolt (see Fig. 5), and when so engaged the washer plate forms a detachable head for the bolt.

In applying such a bolt to the plates P, P, it is not necessary to remove the nut $1^b$ from the threaded portion of the bolt; whereas if a headed bolt is used, it would be necessary to entirely remove the nut from the bolt and insert the bolt through the plates; whereas the slotted washer-plate 2 can be readily detached from the bolt and the latter slipped through the plates, and the washer-plate re-attached thereto without having to remove the nut from the bolt.

Interposed between the nut $1^b$ and outermost plate P is a pair of opposed wedges 3, each provided with a longitudinal slot $3^a$ to accommodate the stem of the bolt, and each may have its larger end concaved as shown at $3^b$. These wedges are adapted to ride one upon the other and by properly relatively moving them the wedges 3 will be tightly bound between the nut 1ᵇ and the outermost plate: and exert forcible longitudinal tension upon the bolt and the plates be bound tightly together between the nut 1ᵇ and the head of the bolt or washer-plate 2, as shown in Figs. 2 and 3.

When the plates are thus securely clamped the wedges 3 may be secured in position, if desired by suitable means. I preferably employ a thin metal locking strip 4, inserted between the wedges, and slotted for the passage of the bolt, and when the wedges are caused to forcibly bind the bolt and plates together the ends of the locking strip 4 are bent over the outer ends of the wedges 3, as shown in dotted line in Fig. 2, and effectively prevent the wedges jarring loose during the riveting of the plates.

In order to quickly and forcibly apply the bolting up device I provide means for forcibly telescoping the wedges together. The preferred means for this purpose comprises a metal frame having parallel side members 5 spaced apart sufficiently to allow the wedges 3 to enter between them; and united at one end by a transverse end member 5ᵃ, which is adapted to engage the concaved end of one of the wedges. Connected with the other end of the clamping frame or members 5, opposite the end member 5ᵃ, is an actuating member which, as shown in Figs. 1–4, has a head portion 6, adapted to engage with the concaved end of the adjacent wedge 3, and a short handle portion 6ᵃ by which the head can be rocked. The actuating member can be adjusted as indicated in dotted lines in Figs. 2 and 3, to engage the outer end of the adjacent wedge 3, and then by turning the handle in the direction indicated by the dotted arrow the end of the head 6 engages one wedge 3, while the member 5ᵃ of the frame engages the end of the opposite wedge and both wedges can be simultaneously moved in opposite directions by the proper turning of the said actuating member—and the wedges cause the bolt to tightly bind the plates together as indicated in Figs. 2 and 3.

The actuating member is preferably pivoted between the side members 5 of the frame by means of a pin 6ᵇ having bearings in openings or slots in the side members 5. To enable an extra amount of slack between the nut and plates to be readily taken up, each side member 5 may be provided with two bearing recesses 5ᶜ, 5ᵈ with either of which the pin 6ᵇ can be engaged, and this pin can be shifted from one set of recesses to the other through connecting slots 5ᵉ, as indicated in the drawing.

If desired the surface of the wedges 3 may be roughened or milled to cause them to more securely bind together when tightened.

Instead of the actuating member 6, the clamping frame might be provided with any suitable means opposite the bar 5ᵃ to force the wedges 3 together to tighten the bolt as in Fig. 1.

*Operation*

When two plates P, P′, or other structural objects, are to be bolted up, the overlapped perforated portions of the plates are brought into juxtaposition; then a bolt 1 is slipped through registering holes in the plates. In the construction shown in Fig. 1, the nut 1ᵇ is left on the bolt and the wedges and plates are strung on the bolt before its slotted end is inserted through the holes in the plates; and after the bolt is inserted the washer-plate is engaged with the slots in the bolt end, thus loosely tying the plates together. When a headed bolt is used the nut 1ᵇ must first be removed therefrom and after its threaded end is passed through registering holes in the plates the wedges are slipped onto the bolt, and the nut screwed on the bolt exterior to the wedges. In either case after the bolt and wedges are temporarily engaged with the plates as described, the frame 5 is placed around the bolt and wedges; then the wedges are forcibly moved by manipulating the actuating member so as to force the wedges together and cause them to forcibly bind between the nut and the outermost plate; thereby binding the two plates tightly together; then the frame can be removed; and if desired the metal retainer strip 4 (previously placed between the wedges) can have its ends turned over the ends of the wedges to lock them in place; or wedges may be roughened to insure sufficient friction therebetween to prevent them being disengaged or loosened by jarring.

The novel bolting up devices are convenient for use by bolters, reamers, and riveters, and renders it easy to "bolt up" the plates, and also to "knock down," after the plates are riveted together. These bolting up devices are adapted to be used in ship construction; on bridge work, and on other construction work where bolting up is done and will save much time and labor.

These bolting up devices do not require skilled operators, are simple in construction and operation, and will effectively perform the work.

While the invention is particularly intended for use in bolting up the plates of iron ships, it is readily adaptable to bolting up other forms of structural iron work, and for use in other constructions where bolting up is required.

I claim:

1. A bolting up device, comprising a bolt adapted to transfix the plates to be bolted up, and having a removable member engaged therewith at one side of the plates;

a member on the bolt at the opposite side of said plates; and wedge means on said bolt engaging said last mentioned member and the adjacent plate and adapted to cause the bolt to bind the plates securely together.

2. A bolting up device, comprising a bolt adapted to transfix the plates to be bolted up an adjustable member on one end of the bolt adapted to engage the outermost plate at one side of the plates; a member on the bolt at the other side of the plates; and slidable wedge means on said bolt engaging said last mentioned member and the adjacent plate adapted to cause the bolt to bind the plates securely together.

3. A bolting up device, comprising a bolt adapted to transfix the plates to be bolted up, an adjustable member on one end of the bolt adapted to engage the outermost plate at one side of the plates; a member on the bolt at the other side of the plates; opposed wedges on said bolt between said last mentioned member and the plates and adapted to cause the bolt to bind the plates securely together with means to hold the wedges in locked position.

4. A bolting up device, comprising a bolt adapted to transfix the plates to be bolted up; a member on the bolt; opposed wedges on said bolt between said member and the plates and adapted to cause the bolt to bind the plates securely together, with a locking member interposed between the wedges and adapted to have its ends bent down over the ends of the wedges to hold the wedges in locked position.

5. In a bolting up device, the combination of a bolt adapted to transfix the plates to be bolted up and having a member on one end adapted to engage the adjacent plate at one side of the plates; a member on the bolt at the opposite side of the plates; and wedge means on said bolt engaging said last mentioned member and the adjacent plates adapted to cause the bolt to bind the plates securely together.

6. In a bolting up device, the combination of a bolt adapted to transfix the plates to be bolted up and having a member on one end adapted to engage the adjacent plate at one side of the plates; a member on the bolt at the opposite side of the plates; opposed wedges on said bolt between said last mentioned member and the plates, adapted to cause the bolt to bind the plates securely together, and means for holding the wedges in locked position.

7. In a bolting up device, the combination of a bolt adapted to transfix the plates to be bolted up and having a member on one end adapted to engage the adjacent plate at one side of the plates; a member on the bolt at the opposite side of the plates; opposed wedges on said bolt between said last mentioned member and the plates, adapted to cause the bolt to bind the plates securely together, with a locking member interposed between the wedges and adapted to have its ends bent down over the ends of the wedges to hold the wedges in locked position.

8. Bolting up means for ship plates and the like, comprising a bolt adapted to be inserted through registered openings in the plates and having means on one end to engage a plate and prevent the bolt slipping through the plates, and a member on the bolt at the other side of the plates; a pair of slotted wedges strung on the bolt between the said member and the plates and adapted to be shifted to cause the bolt to bind the plates closely together.

9. Bolting up means for ship plates and the like, comprising a bolt adapted to be inserted through registered openings in the plates, said bolt having a notched end and a slotted plate engaging said notched end to prevent the bolt slipping through the plates, and a member on the bolt at the opposite side of the plates, and wedge means on the bolt between the said member and the plates adapted to cause the bolt to bind the plates closely together.

10. Bolting up means for ship plates and the like, comprising a bolt adapted to be inserted through registered openings in the plates, said bolt having a notched end, a slotted plate engaging said notched end to retain the bolt in engagement with the plates, and an adjustable nut on the other end of the bolt; a pair of slotted wedges strung on the bolt between the said nut and the plates and adapted to cause the bolt to bind the plates closely together.

11. A bolting up device, comprising a bolt adapted to transfix the members to be bolted up; a member on the bolt; opposed wedges on said bolt between said member and the plates and adapted to cause the bolt to bind the plates securely together, with means for tightening the wedges comprising a frame adapted to embrace the wedges and having a member at one end adapted to engage one of the wedges, and an actuating member at the other end of the frame adapted to engage the other wedge, whereby the wedges may be simultaneously shifted to cause the bolt to bind the plates together.

12. In devices for bolting up plates and the like, having a bolt and oppositely movable wedges for tightening the bolt; wedge tightening means comprising a frame having a member at one end adapted to engage one of the wedges, and an actuating member connected with the frame and adapted to engage the other wedge, whereby when said actuating member is moved in the proper direction the wedges are forced together.

13. In devices for bolting up plates and the like, having a bolt and oppositely movable wedges for tightening the bolt; wedge tightening means comprising a frame adapted to be slipped over the wedges and bolt, and having a member at one end adapted to engage one of the wedges, and an actuating member adjustably connected with the opposite end of the frame and adapted to engage the other wedge, whereby when said actuating member is moved in the proper direction the wedges are forced together.

14. In devices for bolting up plates and the like, having a bolt and oppositely movable wedges for tightening the bolt; wedge tightening means comprising a frame having a member at one end adapted to engage one of the wedges, and the side members of the frame having spaced notches adjacent the other end of the frame; an actuating member adapted to engage the other wedge and provided with means engaging the notches in the frame, whereby when said actuating member is moved in the proper direction the wedges are forced together.

15. In devices for bolting up plates and the like, having a bolt transfixing the plates, and oppositely movable wedges for tightening the bolt; a wedge tightening means comprising a frame adapted to be slipped over the wedges and bolt, said frame having a member at one end adapted to engage one of the wedges, and the side members of the frame having spaced connected notches adjacent the other end of the frame; an actuating member; a pin connected with the actuating member and engaging the notches in the frame, said actuating member being adapted to engage the other wedge, whereby when said actuating member is moved in the proper direction the wedges are forced together.

In testimony whereof I affix my signature in the presence of two witnesses.

JAMES W. WARREN.

Witnesses:
ROBINSON MONROE,
CARL BUDWESKY.